(12) United States Patent
Lee et al.

(10) Patent No.: US 8,352,591 B2
(45) Date of Patent: Jan. 8, 2013

(54) PRESENCE NETWORK AGENT IN IMS NETWORKS

(75) Inventors: Jay J. Lee, San Ramon, CA (US); Vishnu Shukla, Dover, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 24 days.

(21) Appl. No.: 12/404,567

(22) Filed: Mar. 16, 2009

(65) Prior Publication Data

US 2010/0235423 A1 Sep. 16, 2010

(51) Int. Cl.
*G06F 15/173* (2006.01)
*G06F 15/16* (2006.01)

(52) U.S. Cl. ........................ 709/224; 709/202

(58) Field of Classification Search .................. 709/224
See application file for complete search history.

(56) References Cited

U.S. PATENT DOCUMENTS

| | | | |
|---|---|---|---|
| 7,720,082 B2 * | 5/2010 | Fridman et al. ............... | 370/401 |
| 2003/0009530 A1 | 1/2003 | Philonenko et al. | |
| 2005/0169446 A1 | 8/2005 | Randall et al. | |
| 2005/0220139 A1 * | 10/2005 | Aholainen .................... | 370/466 |
| 2006/0117050 A1 | 6/2006 | John et al. | |
| 2006/0221837 A1 * | 10/2006 | Gardner et al. ............... | 370/241 |
| 2007/0240189 A1 * | 10/2007 | Paila .............................. | 725/62 |
| 2008/0126360 A1 | 5/2008 | Kakuta et al. | |
| 2008/0162637 A1 | 7/2008 | Adamczyk et al. | |
| 2008/0228929 A1 * | 9/2008 | Kiss ............................. | 709/228 |
| 2008/0313321 A1 * | 12/2008 | Kiss et al. ..................... | 709/223 |
| 2009/0113068 A1 * | 4/2009 | Fujihira et al. ................ | 709/231 |
| 2009/0275314 A1 * | 11/2009 | Cotevino et al. ........... | 455/414.2 |

FOREIGN PATENT DOCUMENTS

| | | |
|---|---|---|
| EP | 1206106 | 5/2002 |
| WO | WO-2008/102265 | 8/2008 |

OTHER PUBLICATIONS

3GPP TS 23.141; $3^{rd}$ Generation Partnership Project; Technical Specification Group Services and System Aspects; Presence Service; Architecture and functional description (Release 6), V6.7.0 (Sep. 2004), 34 pages.

* cited by examiner

*Primary Examiner* — Kenny Lin
*Assistant Examiner* — Gerald Smarth (57) ABSTRACT

A system determines presence updates associated with presence user agents (PUAs), where the presence updates indicate changes in a presence status associated with each of the PUAs. The system further determines an application type associated with each of the PUAs and routes the presence updates to respective presence network agents (PNAs) based on the determined application type.

23 Claims, 7 Drawing Sheets

PRESENCE NETWORK AGENT IN IMS NETWORKS

BACKGROUND

The Internet Protocol (IP) multimedia subsystem (IMS), defined by the $3^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. IMS aims to ensure that IMS applications work consistently across different network infrastructures. In addition to 3GPP, Open Mobile Alliance (OMA) plays an important role in specifying and developing IMS service standardization. The services are built on top of IMS infrastructure, and they include presence service, group management and instant messaging (IM).

3GPP defines the presence IMS architecture to support presence services in IMS. Presence is a basic service that is very likely to become ubiquitous in the near future. A presence service allows a user to be informed whether or not other users are online and, if they are online, whether they are idle, busy or away, what their moods are (e.g., emoticons), what their communication capabilities are (e.g., audio, video, and IM), etc.

The presence architecture defines various presence roles to existing functional entities in the IMS. The person who is providing presence information is known as the presence entity. A given presence entity can have multiple devices such as mobile phones, laptops, or desktop computers. Each of the multiple devices implements a presence user agent (PUA) and provides information about the presence entity's presence. The PUAs send their presence information to a presence server (PS) via presence updates. The PS gathers received presence information and obtains a complete picture of the presence entity. A watcher is an entity that requests presence information about a presence entity from the PS. The PUA updates a presence entity's status maintained in the PS as soon as a presence status changes. The PS, in turn, notifies all watchers of a presence entity of each received presence status change.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

The existing presence architecture in IMS poses a number of problems when it is deployed in a real-world network. One problem is that the existing presence architecture does not have any mechanism for communication between PUAs and a Presence Network Agent (PNA). This creates privacy issues for users. Suppose that a user attaches to a network but wants to be known as "offline" to all watchers. The user may have an option of sending explicit presence update messages to the PS that the user is offline to all watchers. However, if the PNA is implemented in the network, the PNA will detect the information that user is online and publish the information to the PS without letting the user know.

The missing communication link between the PUA and the PNA also creates unnecessary traffic to the network. Without knowing that the PNA is present in the network, the PUA will send presence updates to the PS whenever there are changes in the user's presence status. At the same time, the PNA may also detect the user's presence updates in the network and send the update information to the PS, thereby sending duplicate update messages to the PS. In a mobile network where bandwidth is scarce, this may cause inefficient resource utilization and poor performance of the presence services.

In large IMS networks, several PSs may be deployed for better performance, load balancing and redundancy purposes. In this case, the issue is how the PNA learns which PS serves which presence entities. Without this information, the PNA cannot route the presence updates to the correct PS.

In the future, the presence services may be required by many applications, such as, for example, instant messaging (IM), push-to-talk, video conferencing, etc. It may be beneficial to deploy different PNA for individual application types, where each PNA provides presence information to support a specific service. In this case, a new framework for accommodating multiple PNAs for individual application types within the IMS may be needed.

Exemplary embodiments described herein improve the performance of presence services within the IMS without modifying the reference architecture of 3GPP. The current presence service architecture within IMS networks by 3GPP has a number of issues to be resolved to support the presence services while satisfying all of the required features and performance objectives. Such issues include, for example, inefficient resource utilization in radio access networks, privacy issues of users, lack of dedicated presence services optimized for each application, and inadequate support for large IMS networks.

As described herein, presence broker (PB) and multiple sub-Presence Network Agent (PNA) functions may be implemented within a PNA. Additionally, a direct communication link between the PB and PUAs may be implemented such that multiple PSs can interface with the PB inside a PNA. Unlike existing approaches where one PNA processes all of the presence updates for all application types, multiple sPNAs may be implemented so that each sPNA may be responsible for one individual application type. The PB may route among multiple sPNAs as well as routing among multiple PSs. With the interface between the PB and PUAs, the PB may process presence update messages from both PUA and PNA, and forward filtered presence update messages to the PS.

Figure 1:
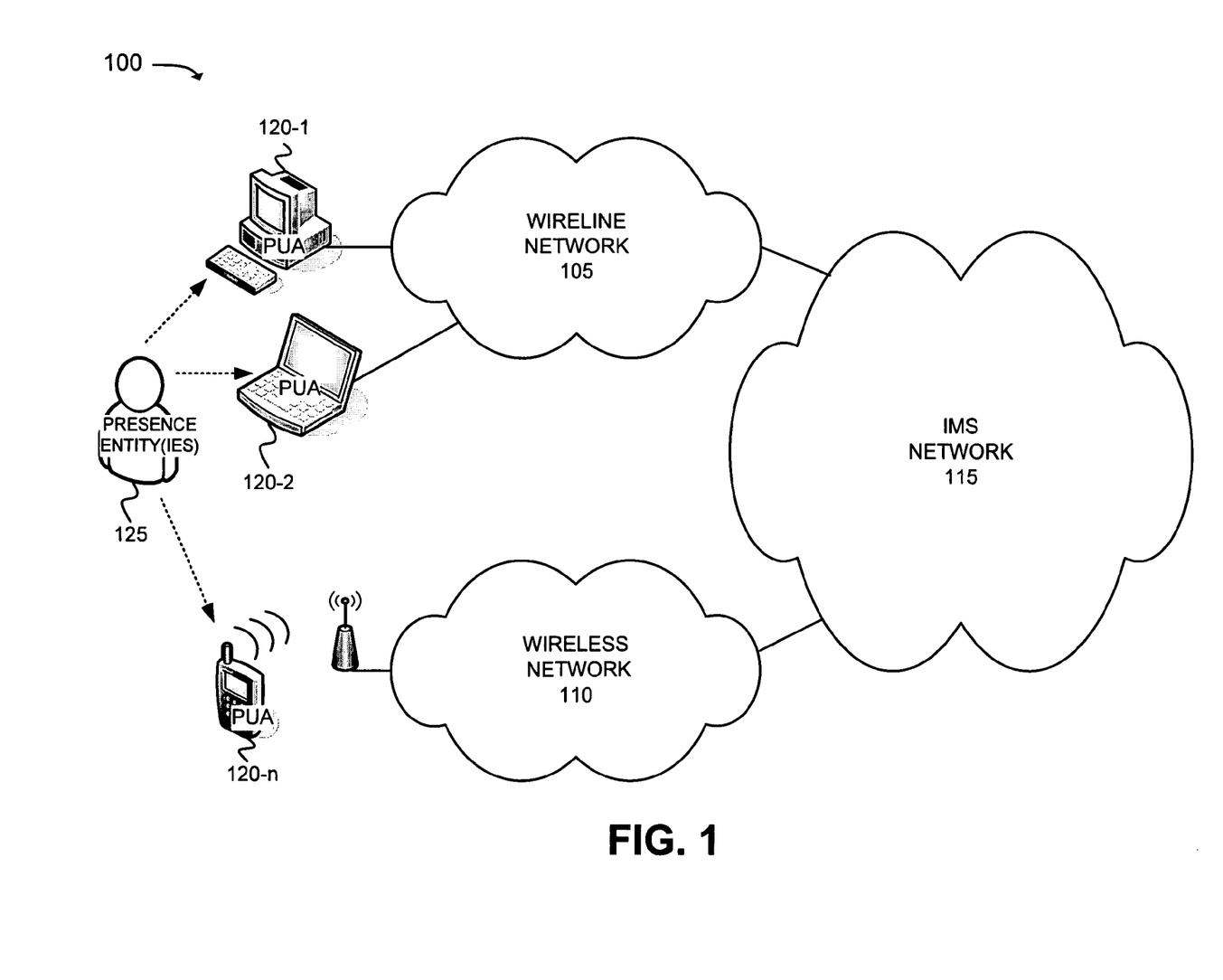
FIG. 1 is a diagram of a presence services network according to an exemplary implementation.

FIG. 1 is a diagram of a presence services network 100 according to an exemplary implementation. Presence services network 100 may implement a presence service as described herein. The presence service allows a user to be informed whether or not other users are online and if they are on-line, whether they are idle or busy. The presence service further allows a user to be informed of what the communications capabilities are of the other users (e.g., audio, video, IM). Presence services network 100 may include a wireline network 105 and a wireless network 110 both connected to an IMS network 115. Presence User Agents (PUAs) 120-1 through 120-*n* (referred to generally as "PUA 120"), associated with one or more presence entities 125, may connect to either, or both of, wireline network 105 or wireless network 110.

Wireline network 105 may include one or more wireline-based networks, such as, for example, a local area network (LAN), a wide area network (WAN), a metropolitan area network (MAN), an intranet, and/or the Internet. Wireless network 110 may include one or more wireless-based networks, such as, for example, a wireless satellite network and/or a wireless public land mobile network (PLMN). IMS network 115 may include a network that may interact with networks 105 and 110 to implement IP-based telephony and multimedia services. Further details of IMS network 115 are described below with respect to FIG. 2.

PUAs 120-1 through 120-*n* may be implemented within computers or wireless devices. The computers may include, for example, wired laptop or desktop computers. The wireless devices may include wireless computers, cell phones, smart phones, or personal digital assistants (PDAs). The computers and wireless device may be referred to herein as "user equipment (UE)." PUAs 120-1 through 120-*n* may use services provided by IMS network 115. In particular, PUAs 120-1 through 120-*n* may use presence services provided by IMS network 115 that indicate a presence status of presence entity 125. The presence status may include, for example, whether presence entity 125 is online, offline, away, idle and/or busy, the communication capabilities of PUA 120 (e.g., audio, video, IM) or "moods" of presence entity 125. The moods of presence entity 125 may include any emotional or physical state that can be experienced by a human. For example, emotional states may include happiness, contentment, excitement, indifference, anger, sadness, frustration, etc. Common physical states may include hunger, fatigue, illness, etc.

Figure 2:
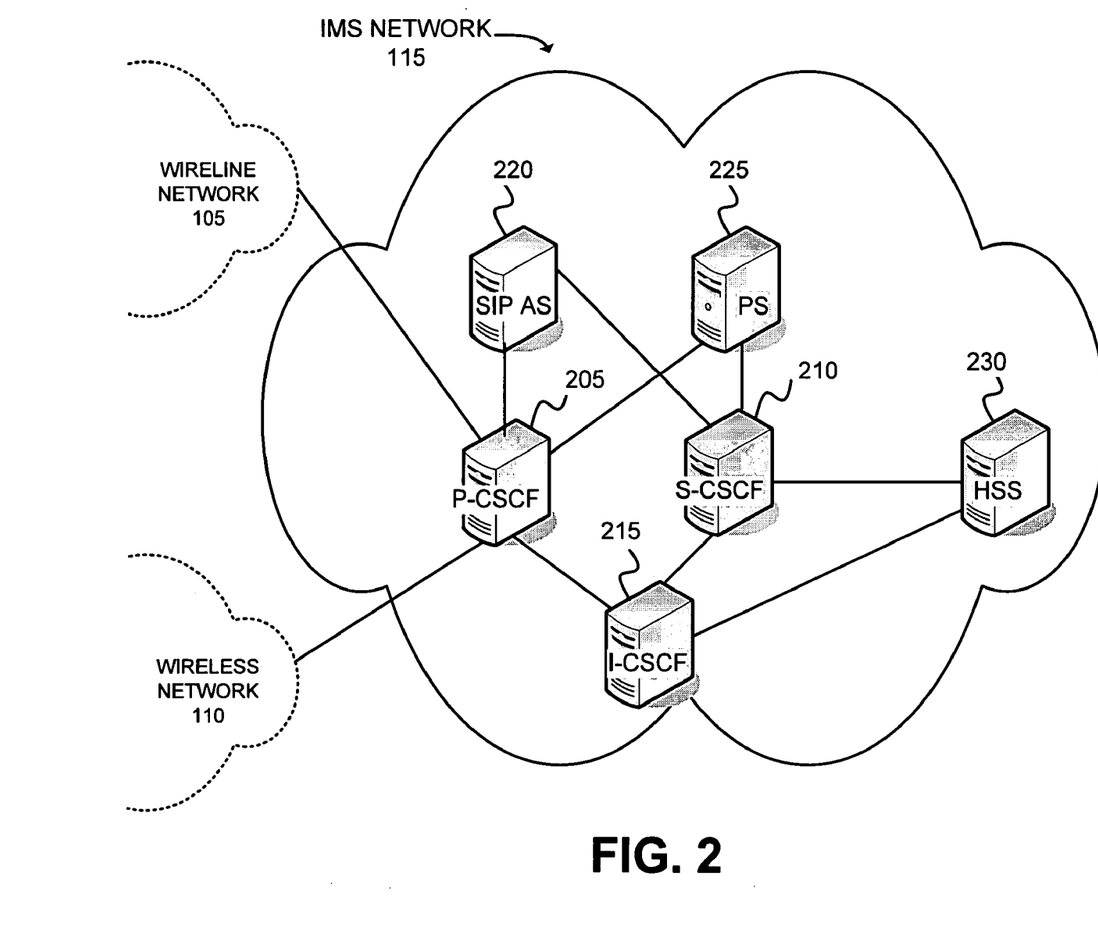
FIG. 2 is a diagram that depicts further exemplary details of the IMS network of FIG. 1.

FIG. 2 depicts further details of IMS network 115. As shown, IMS network 115 may include a proxy call/session control function (P-CSCF) server 205, a serving CSCF (S-CSCF) server 220, an interrogating CSCF (I-CSCF) 215, a Session Initiation Protocol application server (SIP AS) 220, a presence server (PS) 225, and a home subscriber server (HSS) 230.

P-CSCF server 205 may include a SIP server that serves as a first point of contact between the IMS-based PUA and IMS network 115. P-CSCF server 205 serves as an outbound/inbound SIP proxy server, where requests initiated by the PUAs/UEs may traverse to P-CSCF server 205. S-CSCF server 210 may include a SIP server that serves as a central node in the SIP signaling plane. S-CSCF server 210 may perform session control. I-CSCF 215 may include a SIP server that may be located at an edge of an administrative domain. I-CSCF 215 may publish its IP address in the Domain Name System (DNS) record of the domain in which I-CSCF 215 resides so that remote servers can find I-CSCF 215 and use I-CSCF 215 as a forwarding point for SIP packets in the domain. In addition to SIP proxy functionality, I-CSCF 215 may include an interface to HSS 230 to retrieve user information and to route messages to an appropriate destination (e.g., S-CSCF).

SIP AS 220 may include an SIP entity that hosts and executes services, and interfaces with S-CSCF 210. PS 225 may collect, store, and share presence status information, associated with PUAs, with other devices, referred to herein as "watchers." "Watchers" may include any device (e.g., laptop computer, desktop computer, telephone) that may access the status information stored at PS 225. HSS 230 may include a master user database that supports IMS network 115 and contains subscription-related information. HSS 230 may perform authentication and authorization of users and can provide information about a subscriber's location and IP information.

Figure 3:
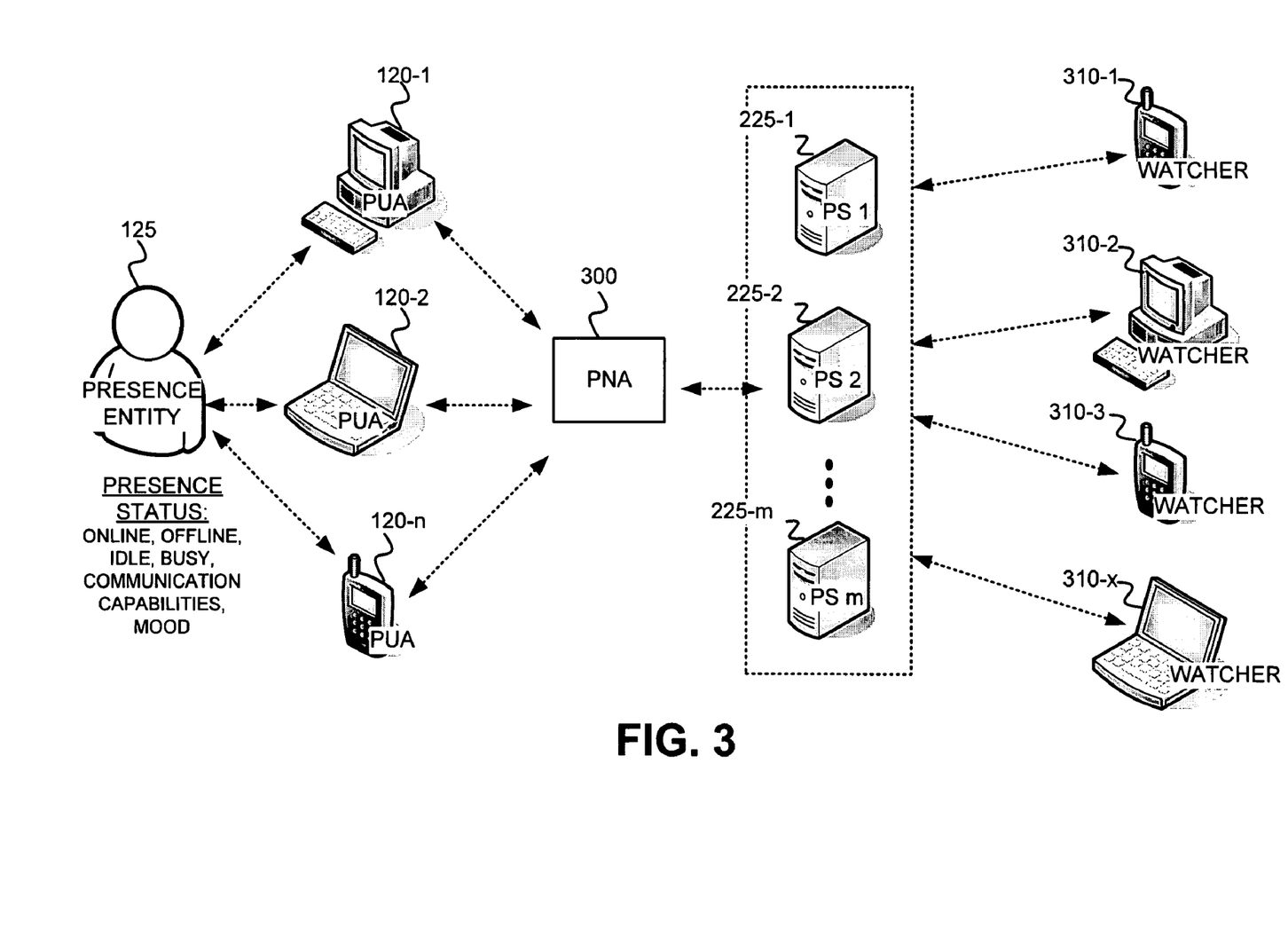
FIG. 3 is a diagram that illustrates exemplary roles associated with the various components involved in presence services implemented by the presence network of FIG. 1.

FIG. 3 is a diagram that illustrates exemplary roles associated with the various components involved in presence services implemented by presence network 100. As shown in FIG. 3, implementation of the presence services may involve a Presence Network Agent (PNA) 300 which may serve to collect presence information from PUAs 120-1 through 120-*n* and provide that presence information to one or more PSs 225-1 through 225-*m*. The presence information may include, for example, a presence status (e.g., offline, on-line, busy, idle) associated with a presence entity 125 using one or more PUAs. The presence information may additionally include communication capabilities of each of the PUAs. PNA 300 may collect presence information from PUAs 120-1 through 120-*n* by either sniffing user traffic to/from PUAs 120-1 through 120-*n* to deduce presence status of each of PUAs 120-1 through 120-*n*, or by receiving presence status updates from PUAs 120-1 through 120-*n* that indicate presence status changes occurring at PUAs 120-1 through 120-*n*. PNA 300 may route presence updates to selected ones of PSs 225-1 through 225-*m* so as to improve performance of presence services, enable load balancing, and/or enable redundancy. PSs 225-1 through 225-*m* may collect and store presence status information received from PNA 300 for use by watchers 310-1 through 310-*x* in obtaining presence status information associated with one or more of PUAs 120-1 through 120-*n*.

Figure 4:
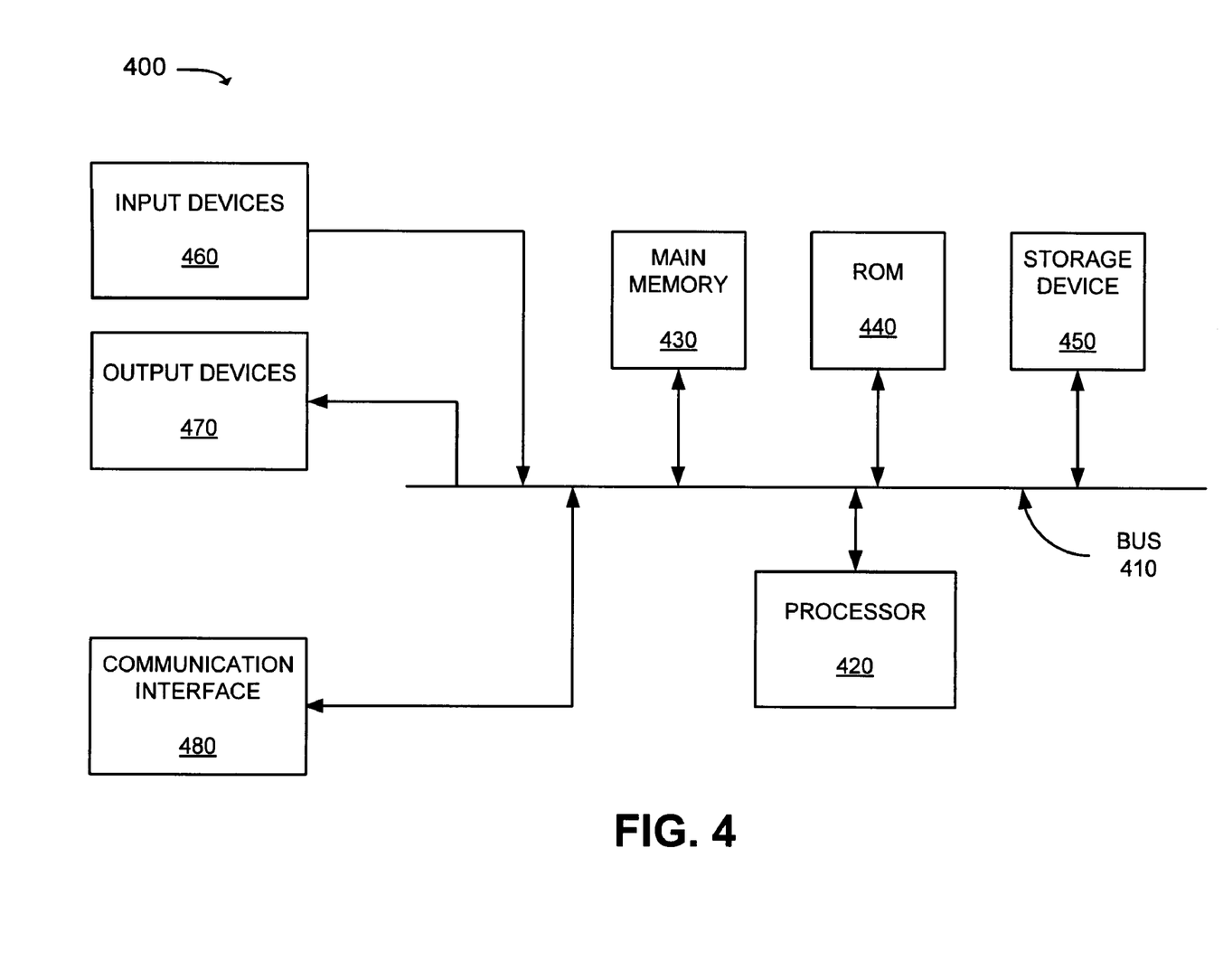
FIG. 4 is a diagram of a device according to an exemplary implementation.

FIG. 4 is a diagram of a device 400 according to an exemplary implementation. PNA 300 may be implemented by device 400. Device 400 may correspond to other devices described herein such as, for example, PS 225. Device 400 may include a bus 410, a processor 420, a main memory 430, a read only memory (ROM) 440, a storage device 450, input devices 460, output devices 470, and a communication interface 480. Bus 410 may include a path that permits communication among the elements of device 400.

Processor 420 may include, for example, a processor, microprocessor, and/or processing logic that may interpret and execute instructions. Main memory 430 may include a random access memory (RAM) or another type of dynamic storage device that may store information and instructions for execution by processor 420. ROM 440 may include a ROM device or another type of static storage device that may store static information and instructions for use by processor 420. Storage device 450 may include a magnetic and/or optical recording medium and its corresponding drive.

Input devices 460 may include mechanisms that permit an operator to input information to device 400, such as a keyboard, a mouse, a pen, voice recognition and/or biometric mechanisms, etc. Output devices 470 may include mechanisms that output information to the operator, including a display, a printer, a speaker, etc. Communication interface 480 may include any transceiver-like mechanism that enables device 400 to communicate with other devices and/or systems. For example, communication interface 480 may include mechanisms for communicating with another device or system via a network.

Device 400 may perform certain operations or processes, as will be described in detail below. Device 400 may perform these operations in response to processor 420 executing software instructions contained in a computer-readable medium, such as memory 430. A computer-readable medium may be defined as a physical or logical memory device.

The software instructions may be read into memory 430 from another computer-readable medium, such as storage device 450, or from another device via communication interface 480. The software instructions contained in memory 430 may cause processor 420 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

Figure 5:
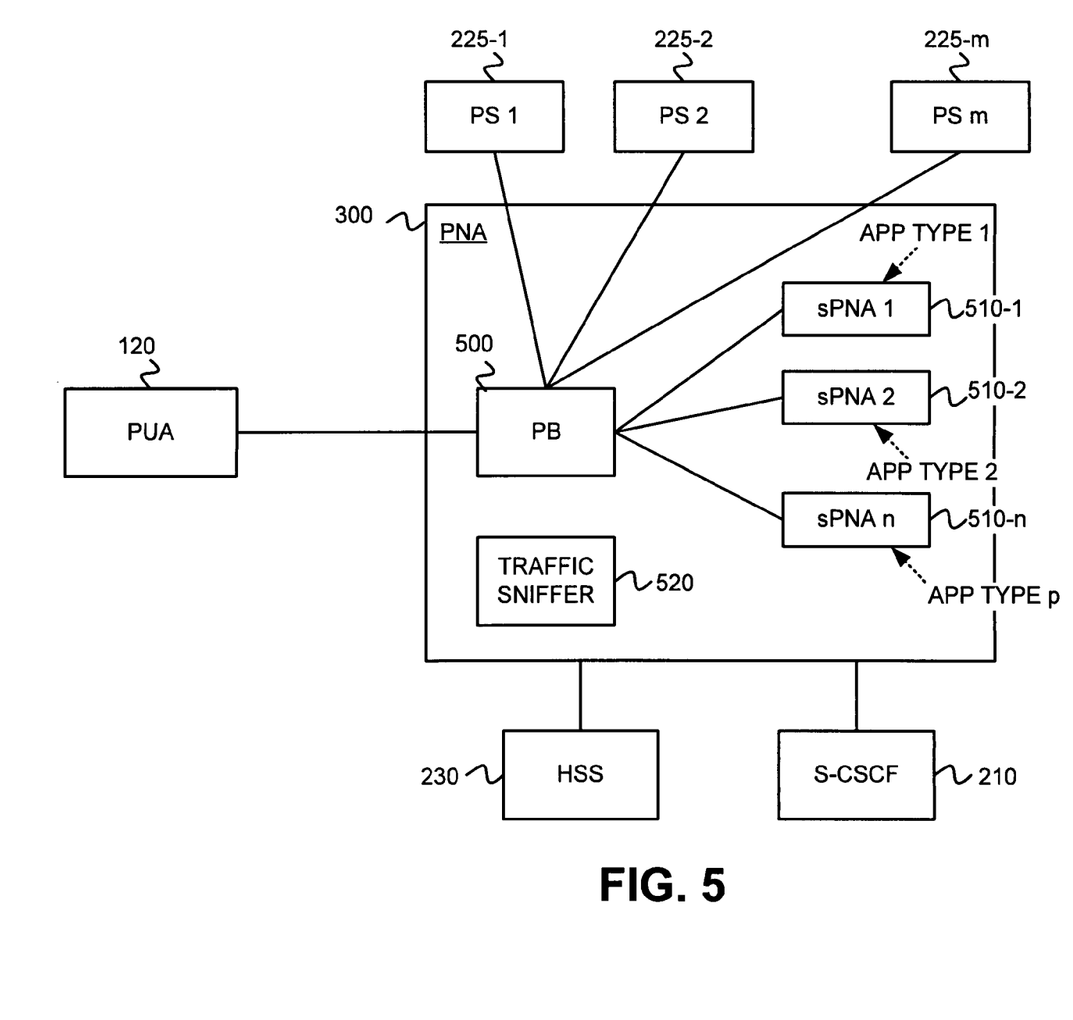
FIG. 5 depicts a functional diagram of the PNA of FIG. 3 according to an exemplary implementation.

FIG. 5 depicts a functional system diagram of PNA 300 according to an exemplary implementation. As shown in FIG. 5, PNA 300 may include a presence broker (PB) 500, a traffic sniffer 520, and multiple sub-PNAs (sPNAs) 510-1 through 510-*p*.

PB 500 may receive presence updates from PUA 120 and may determine an application type associated with PUA 120 (i.e., the type of the application being executed at PUA 120 that originates the presence update). PB 500 may route each received presence update to a respective one of PSs 225-1 through 225-*m*. Traffic sniffer 520 may "sniff" user traffic sent to/from PUA 120 and may deduce a presence state, or presence state change, based on the sniffed user traffic. PB 500 may further route a received presence update to one of sPNAs 510-1 through 510-*p* based on the determined application type associated with PUA 120 from which the presence update was received. PB 500 may maintain routing information of PSs 225-1 through 225-*m* and may execute routing decisions for forwarding presence updates to a correct PS 225 when there are multiple PSs within IMS network 115. PB 500 may analyze presence updates (e.g., either explicitly received from PUA 120 or deduced via sniffing on user traffic) and may forward the presence updates to PS 225. sPNAs 510-1 through 510-*p* may each manage presence information based on application type (e.g., IM, push-to-talk, video conferencing, etc.) so as to optimize the presence service for individual application types. Thus, for example, sPNA 1 510-1 may manage presence information associated with application type 1 (e.g., an IM application), sPNA 2 510-2 may manage presence information associated with application type 2 (e.g., a push-to-talk application), and sPNA p 510-*p* may manage presence information associated with application type p (e.g., a video conferencing application).

Figure 6:
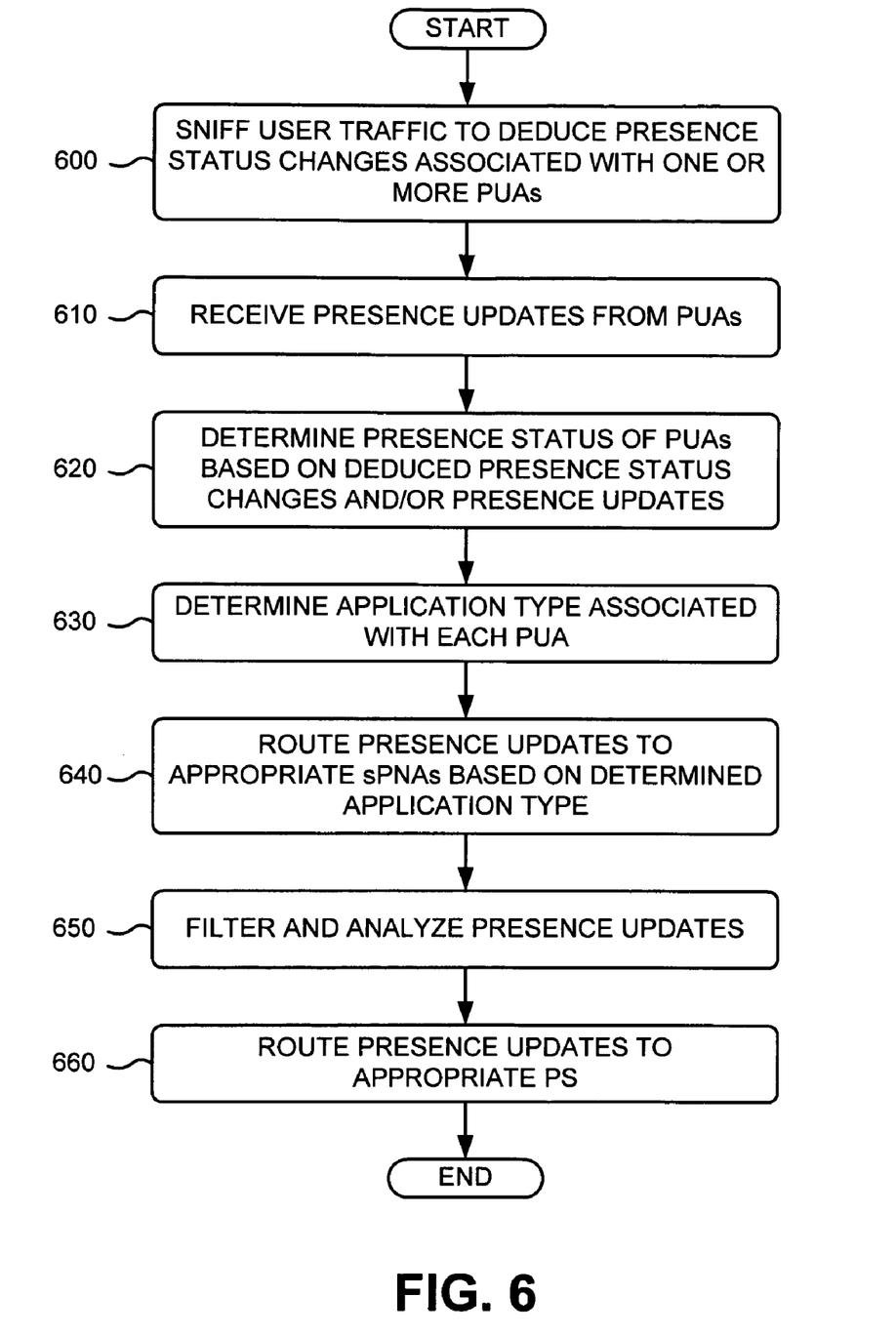
FIG. 6 is a flow diagram illustrating an exemplary process for processing and routing presence status updates.

FIG. 6 is a flow diagram illustrating an exemplary process for processing and routing presence status updates. The exemplary process of FIG. 6 may be performed by PNA 300. The exemplary process of FIG. 6 is described herein with reference to one or more of FIGS. 1-5.

Figure 7:
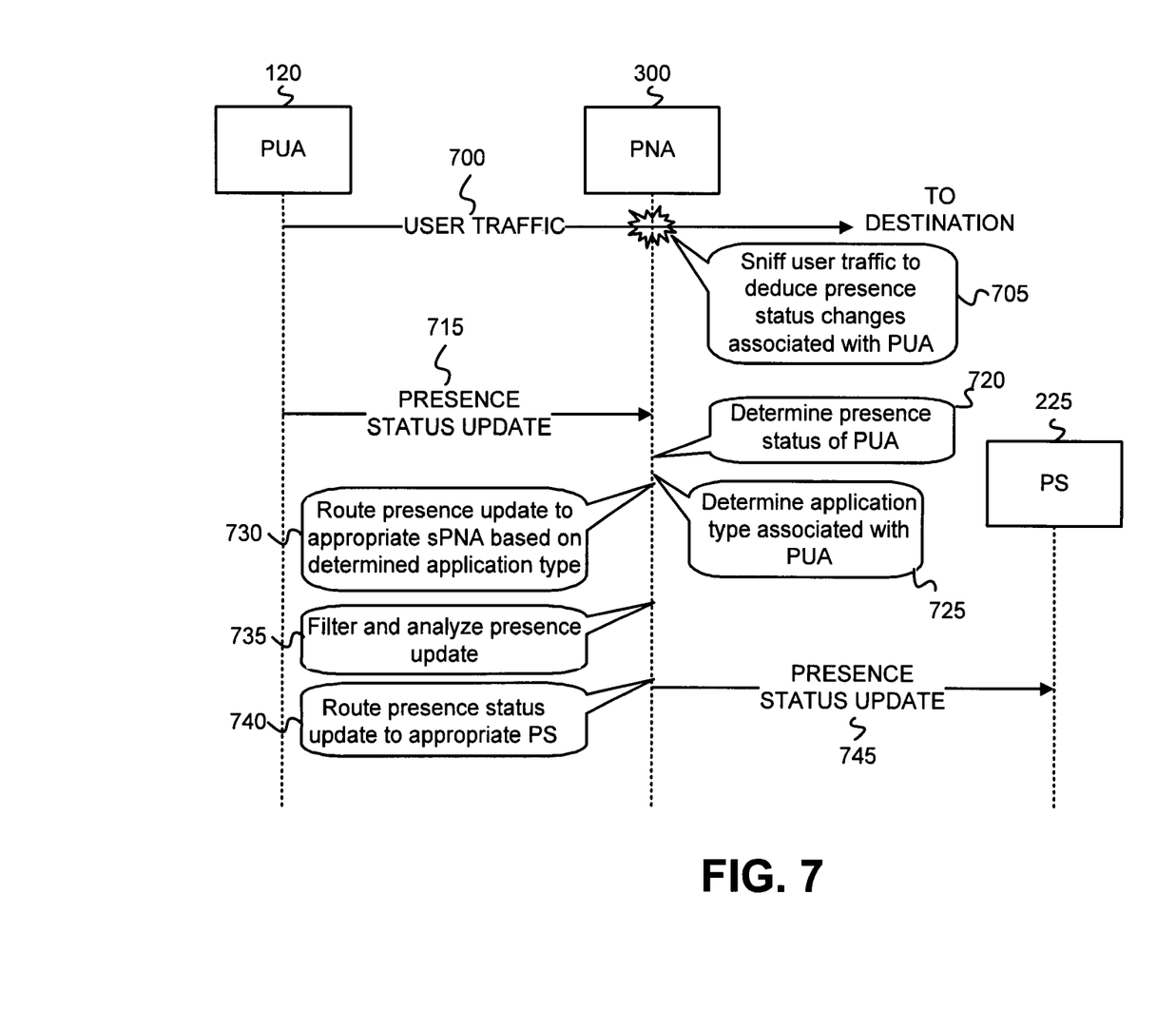
FIG. 7 is an exemplary messaging diagram associated with the exemplary process of FIG. 6.

The exemplary process may begin with sniffing user traffic to deduce presence status changes associated with one or more PUAs (block 600). Traffic sniffer 520 of PNA 300 may sniff user traffic sent to/from PUAs 120-1 through 120-*n* to deduce presence status changes associated with one or more PUAs. For example, user traffic sent from PUA 120 may enable PNA 300 to deduce that PUA 120 has changed from an off-line to an on-line status. FIG. 7 depicts user traffic 700 sent from PUA 120 being sniffed 705 at PNA 300. Returning to FIG. 6, presence updates from the PUAs may be received (block 610). PB 500 may receive the presence updates from PUAs 120-1 through 120-*n* via direct communication links between PB 500 and PUAs 120-1 through 120-*n*. FIG. 7 depicts a presence status update 715 being sent from PUA 120 to PNA 300. FIG. 6 depicts block 600 as occurring before block 610. Blocks 600 and 610, however, may occur in any order relative to on another (e.g., block 610 can occur before block 600, etc.)

The presence status of PUAs may be determined based on deduced presence status changes and/or presence updates (block 620). FIG. 7 depicts PNA 300 determining 720 the presence status of PUA 120 based on the deduced presence status changes and/or presence updates. An application type associated with each PUA may be determined (block 630). For example, PB 500 may identify whether each PUA is implementing an IM application, a push-to-talk application, or a video conferencing application. FIG. 7 depicts PNA 300 determining 725 an application type associated with PUA 120.

Presence updates may be routed to appropriate sPNAs based on the determined application type (block 640). FIG. 7 depicts the presence update being routed 730 to an appropriate sPNA based on the determined application type. Referring back to FIG. 5, for example, a determined application type 1 may be routed to sPNA 1 510-1, a determined application type 2 may be routed to sPNA2 510-2, etc. The presence updates may be filtered and analyzed (block 650) and the presence updates may be routed to an appropriate PS (block 660). FIG. 7 depicts presence status update 715 being filtered and analyzed 735 and routed 740 to PS 225 via presence status update message 745.

Provision of a direct line between the PUA and PB, as described herein, eliminates duplicate presence update messages being sent to the PS from both the PUA and the PNA. The PB gathers the updates from the PUA and PNA and sends the updates to the PS, thus, reducing traffic load in the network, reducing processing time for the PUA, and resulting in better performance. In wireless networks, where bandwidth is a critical issue, the improvement can be significant.

The link between each PUA and the PB also protects the privacy of users. The user, for some reason, may want to indicate "offline" or "away" to all watchers when the user logs in to the system. While the user can indicate his status via the PUA to the PS, the PNA in the network can detect that the user has just logged into the system and may send an "online" update message to the PS on behalf of the user. This can happen without the knowledge of the user who has just logged in. In the exemplary embodiments described herein, the PB always receives the presence information from both the PUA and the PNA, processes the updates based on certain rules, and sends the updates to the PS. The processing by the PB may be, for example, that the presence updates from the PUA takes priority over the PNA (i.e., the PB will override the update messages from the PNA).

In a large IMS network, there may be multiple PSs deployed in the network for better performance, load balancing and redundancy. Current presence services architecture does not provide any means for the PNA to know which PS serves which presence entities. In the exemplary embodiments described herein, the PB inside the PNA is responsible for routing update management and correct routing decisions, thus, providing routing functions inside the PNA.

Instead of one PNA managing all presence information for all application types, sub-PNAs are described herein. The tasks typically associated with a single PNA may, thus, be divided among multiple sPNAs based on application types, permitting PNA optimization for individual application types. The PB, as described herein, may be responsible for routing presence updates to correct sPNAs.

The current presence architecture in 3GPP requires the UE to be responsible for routing the presence update information to PSs. By creating a link between the PUA and the PB, such processing-heavy routing responsibility can be moved to the PB, thus, freeing processing resources in the UE.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Modifications and variations are possible in light of the specification, or may be acquired from practice of the invention. For example, while a series of blocks has been described with regard to FIG. 6, the order of the blocks may be modified in other implementations consistent with the principles of the invention. Further, non-dependent blocks may be performed in parallel.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a processor to:
receive presence updates from one or more presence user agents (PUAs), where the presence updates indicate changes in a presence status associated with each of the one or more PUAs, determine presence status changes associated with the one or more PUAs, where the presence status changes are determined based on user traffic of the one or more PUAs, determine an application type, of a plurality of application types, associated with: each of the presence updates, and each of the presence status changes, and route, based on the application type, each of the presence updates and each of the presence status changes to a corresponding one of a plurality of presence network agents, where the presence updates include: first presence updates associated with a first application type, and
second presence updates associated with a second application type, and here the presence status changes include: first presence status changes associated with the first application type, and second presence status changes associated with the second application type; a first presence network agent, of the plurality of presence network agents, to: process the first presence updates and the first presence status changes; and a second presence network agent, of the plurality of presence network agents, to process the second presence updates and the second presence status changes, where the second presence network agent is different than the first presence network agent, and where the second application type is different than the first application type, and where the processor is further to: route the processed first presence updates, the processed second presence updates, the processed first presence status changes, and the processed second presence status changes to one or more presence servers.

2. The device of claim 1, where the presence status, associated with each of the one or more PUAs, includes at least one of: offline, online, away, busy, or idle.

3. The device of claim 1, where the presence status, associated with each of the one or more PUAs, includes a communication capability associated with a respective PUA.

4. The device of claim 1, where the presence status, associated with each of the one or more PUAs, includes a mood of a presence entity associated with a respective PUA.

5. The device of claim 1, where, when determining the presence status changes associated with the one or more PUAs, the processor is to:
sniff user traffic associated with the one or more PUAs, and determine, based on the sniffed user traffic, the presence status changes associated with the one or more PUAs.

6. The device of claim 1, where the device receives the presence status updates from the one or more PUAs via respective links between the device and each of the one or more PUAs.

7. The device of claim 1, where, when routing the processed first presence updates, the processed second presence updates, the processed first presence status changes, and the processed second presence status changes, the processor is to:
route the processed first presence updates, the processed second presence updates, the processed first presence status changes, and the processed second presence status changes to different ones of multiple presence servers that maintain presence status information in a network.

8. The device of claim 7, where the network comprises an Internet Protocol (IP) Multimedia Subsystem (IMS) network.

9. The device of claim 1, where the processed first presence updates, the processed second presence updates, the processed first presence status changes, and the processed second presence status changes are routed to the one or more servers via one or more presence update messages.

10. The device of claim 1, where, when determining the presence status changes associated with the one or more PUAs, the processor is to:
receive, from a third presence network agent, the presence status changes associated with the one or more PUAs, where, when processing the first presence updates and the first presence status changes, the first presence network agent is to provide a higher priority to one of the first presence updates relative to a conflicting one of the first presence status.

11. A method implemented in a computer system, the method comprising: receiving, by a processor of the computer system, presence updates from one or more presence user agents (PUAs), the presence updates indicating changes in a presence status associated with each of the one or more PUAs; determining, by the processor, presence status changes associated with the one or more PUAs, the presence status changes being determined based on user traffic associated with the one or more PUAs; determining, by the processor, an application type, of a plurality of application types, associated with each of the presence updates and associated with each of the presence status changes; routing, by the processor and based on the application type, each of the presence updates and each of the presence status changes to a corresponding one of a plurality of presence network agents including: first presence updates associated with a first application type of the plurality of application types, and second presence updates associated with a second application type, of the plurality of application types, the presence status changes including: first presence status changes associated with the first application type, and second presence status changes associated with the second application type, one of the plurality of presence network agents processing the first presence updates and the first presence status changes and a different one of the plurality of presence network agents processing the second presence updates and the second presence status changes; and routing, by the processor, the processed first presence updates, the processed second presence updates, the processed first presence status changes, and the processed second presence status changes to one or more presence servers.

12. The method of claim 11, where routing the processed first presence updates, the processed second presence updates, the processed first presence status changes, and the processed second presence status changes includes:
routing the processed first presence updates, the processed second presence updates, the processed first presence status changes, and the processed second presence status changes to respective ones of a plurality of presence servers that maintain presence status information.

13. The method of claim 11, where the presence status, associated with each of the one or more PUAs, includes at least one of:
offline, online, away, busy, or idle.

14. The method of claim 11, where the presence status, associated with each of the one or more PUAs, includes a communication capability associated with a respective PUA.

15. The method of claim 11, where the presence status, associated with each of the one or more PUAs, includes a mood of a presence entity associated with a respective PUA.

16. The method of claim 11, where determining presence status changes associated with the one or more PUAs comprises:
monitoring the user traffic associated with the one or more PUAs, and
determining, based on the monitored user traffic, the presence status changes associated with the one or more PUAs.

17. The method of claim 11, where receiving the presence status updates from the one or more PUAs comprises:
receiving the present status updates from the one or more PUAs via a respective link between a presence broker (PB) of the computer system and each of the one or more PUAs.

18. The method of claim 11, where routing processed first presence updates, the processed second presence updates, the processed first presence status changes, and the processed second presence status changes includes:
routing the processed first presence updates, the processed second presence updates, the processed first presence status changes, and the processed second presence status changes to different ones of multiple servers that maintain presence status information in a network.

19. The method of claim 18, where the network comprises an Internet Protocol (IP) Multimedia Subsystem (IMS) network.

20. A non-transitory computer-readable medium storing instructions, the instructions comprising:
one or more instructions that, when executed by one or more processors, cause the one or more processors to receive presence updates from one or more presence user agents (PUAs), the presence updates indicating changes in a presence status associated with each of the one or more PUAs, determine presence status changes associated with the one or more PUAs, the presence status changes being determined based on user traffic of the one or more PUAs, determine an application type, of a plurality of application types, associated with: each of the presence updates, and each of the presence status changes, and route, based on the application type each of the presence updates and each of the presence status changes to a corresponding one of a plurality of presence network agents for processing, the presence updates including:
first presence updates associated with a first application type, and second presence updates associated with a second application type, and the presence status changes including: first presence status changes associated with the first application type, and second presence status changes associated with the second application type, and one of the plurality of presence network agents processing the first presence updates and the first presence status changes and a different one of the plurality of presence network agents processing the second presence updates and the second presence status changes, and route the processed first presence updates, the processed second presence updates, the processed first presence status changes, and the processed second presence status changes to one or more presence servers.

21. The non-transitory computer-readable medium of claim 20, where the one or more instructions to route the processed first presence updates, the processed second presence updates, the processed first presence status changes, and the processed second presence status changes includes
one or more instructions to route the processed first presence updates, the processed second presence updates, the processed first presence status changes, and the processed second presence status changes to respective ones of a plurality of presence servers that maintain presence status information.

22. The non-transitory computer-readable medium of claim 20, where the presence status, associated with each of the one or more PUAs, includes at least one of: offline, online, away, busy, or idle.

23. The non-transitory computer-readable medium of claim 20, where the one or more instructions to determine the presence updates include:
one or more instructions to receive, from a presence network agent, a presence status change associated with one of the one or more PUAs, where the presence status change is determined based on data transmitted by a device associated with the one of the one or more PUAs, one or more instructions to receive, from the one of the one or more PUAs, a presence update that conflicts with the presence status change, and one or more instructions to override the presence status change received from the presence network agent based on the presence update.

* * * * *